(12) United States Patent
Liang et al.

(10) Patent No.: US 11,928,414 B2
(45) Date of Patent: Mar. 12, 2024

(54) CHIP AND PINOUT DESIGN METHOD THEREFOR

(71) Applicant: INSPUR SUZHOU INTELLIGENT TECHNOLOGY CO., LTD., Jiangsu (CN)

(72) Inventors: Lei Liang, Jiangsu (CN); Qingsong Qin, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/270,215

(22) PCT Filed: Nov. 30, 2021

(86) PCT No.: PCT/CN2021/134400
§ 371 (c)(1),
(2) Date: Jun. 29, 2023

(87) PCT Pub. No.: WO2023/024306
PCT Pub. Date: Mar. 2, 2023

(65) Prior Publication Data
US 2023/0394215 A1  Dec. 7, 2023

(30) Foreign Application Priority Data

Aug. 27, 2021 (CN) .......................... 202110991801.9

(51) Int. Cl.
*G06F 30/30* (2020.01)
*G06F 30/392* (2020.01)
(Continued)

(52) U.S. Cl.
CPC .......... *G06F 30/394* (2020.01); *G06F 30/392* (2020.01); *H05K 3/0005* (2013.01);
(Continued)

(58) Field of Classification Search
CPC .... G06F 30/394; G06F 30/392; G06F 30/396; G06F 2115/12; G01N 2035/0436; H05K 2201/09227
See application file for complete search history.

(56) References Cited

U.S. PATENT DOCUMENTS 7,757,196 B2 * 7/2010 Bird ....................... H05K 1/113
716/125
2012/0110538 A1 5/2012 Shih et al.

FOREIGN PATENT DOCUMENTS

CN 104618053 A * 5/2015
CN 106358364 A 1/2017
(Continued)

*Primary Examiner* — Leigh M Garbowski
(74) *Attorney, Agent, or Firm* — IPro, PLLC

(57) ABSTRACT

Provided are a chip and a pin line-out design method therefor, which are applied to a BGA packaged chip. The method includes: according to pin position information and pin definition information of a chip, determining a number of circuit board layers required for pin line-out of the chip (S1); allocating line-out layers to pins of the chip in their respective circuit boards (S2); and according to a pin density and transmission line width requirement of the chip, determining a specification of a via hole in each circuit board for leading the pin of the chip out to the corresponding line-out layer, to perform a corresponding line-out design on the basis of the via hole (S3). It may be seen that the described unified pin line-out design for the BGA packaged chip is more refined, and the quality of the line-out design of the pins of the chip is ensured.

20 Claims, 5 Drawing Sheets

(51) Int. Cl.
  *G06F 30/394* (2020.01)
  *H05K 3/00* (2006.01)
  *G06F 113/18* (2020.01)
  *G06F 115/12* (2020.01)

(52) U.S. Cl.
  CPC ...... *G06F 2113/18* (2020.01); *G06F 2115/12* (2020.01); *H05K 2201/09227* (2013.01)

(56) References Cited

FOREIGN PATENT DOCUMENTS

| | | | | |
|---|---|---|---|---|
| CN | 108241765 | A | | 7/2018 |
| CN | 111027272 | A | | 4/2020 |
| CN | 111881643 | A | * | 11/2020 |
| CN | 112883682 | A | | 6/2021 |
| CN | 113435154 | A | | 9/2021 |
| WO | WO-2020237445 | A1 | * | 12/2020 ....... H01L 21/67121 |
| WO | WO-2023024306 | A1 | * | 3/2023 |

* cited by examiner

CHIP AND PINOUT DESIGN METHOD THEREFOR

CROSS-REFERENCE TO RELATED APPLICATION

This application claims the priority of the Chinese Patent application filed on Aug. 27, 2021 before the China National Intellectual Property Administration with the application number of 202110991801.9, and the title of "CHIP AND PIN LINE-OUT DESIGN METHOD THEREFOR", which is incorporated herein in its entirety by reference.

FIELD

The present disclosure relates to the field of high-speed high-density chips and, more particularly, to a chip and a pin line-out design method therefor.

BACKGROUND

In recent years, servers and communication products continue pursuing high-density miniaturized design, resulting in higher and higher density requirements for chips. With the development of high-speed transmission technologies, most of signals of chips are designed as high-speed signals. At present, high-speed and high-density chips are all packaged in a ball grid array (BGA), of which the most critical link is the pin line-out design of the chip. However, the prior art fails to provide a unified chip pin line-out design for BGA packaged chips, instead designers make designs according to their own experience, resulting in uneven quality in chip pin line-out design.

SUMMARY

The object of the present disclosure is to provide a chip and a pin line-out design method for the chip, providing a unified chip pin line-out design for BGA packaged chips, and the design is more refined, thereby the quality of chip pin line-out design is ensured.

In order to solve the problems stated above, the present disclosure provides a pin line-out design method for a chip, applied to a ball grid array (BGA) packaged chip, the method including:
  according to pin position information and pin definition information of the chip, determining a number of circuit board layers required for pin line-out of the chip;
  allocating respective line-out layer for pins of the chip in a circuit board; and
  determining a pin density of the chip according to a pin spacing of the chip, and determining a specification of a via hole in the circuit board for leading the pin of the chip out to the corresponding line-out layer according to the pin density and transmission line width requirement of the chip, to perform a corresponding line-out design on the basis of the via hole.

In some embodiments, according to the pin position information and the pin definition information of the chip, determining the number of circuit board layers required for the pin line-out of the chip includes:
  determining the pin position information and the pin definition information of the chip based on a pin map of the chip, wherein the pins of the chip include power supply pins, low-speed pins, high-speed pins and ground pins, with a signal transmission rate on a high-speed line connected to the high-speed pins>a preset rate threshold>a signal transmission rate on a low-speed line connected to the low-speed pins;
  according to the pin position information and the pin definition information, determining power supply types corresponding to the power supply pins in different positions, position information of the low-speed pins, high-speed pin pairs composed of high-speed pins in different positions, and position information of a TX pin and a RX pin in each high-speed pin pair; and
  determining the number of circuit board layers required for the pin line-out of the chip according to the power supply types corresponding to the power pins in different positions, the position information of all low-speed pins, and the position information of the TX pin and the RX pin in each high-speed pin pair.

In some embodiments, determining the number of circuit board layers required for the pin line-out of the chip according to the power supply types corresponding to the power pins in different positions, the position information of all low-speed pins, and the position information of the TX pin and the RX pin in each high-speed pin pair includes:
  determining a flow area required by the power supply pins of a same power supply type, and determining a number of first line-out layers required by all power supply pins according to the flow area and a single-layer area of the circuit board, wherein the power supply pins of the same power supply type share one line-out layer;
  determining a total number of low-speed pins according to the position information of all low-speed pins, and determining a number of second line-out layers required by all low-speed pins according to the total number of low-speed pins;
  according to the position information of the TX pin and the RX pin in each high-speed pin pair, determining a number of high-speed pin pairs in a same row on the pin map, and multiplying the determined number by 2 to obtain a number of third line-out layers required by all high-speed pins, wherein the TX pin and the RX pin in each high-speed pair correspond to different line-out layers; and
  adding the number of first line-out layers, the number of second line-out layers and the number of third line-out layers, and multiplying a sum of the number of first line-out layers, the number of second line-out layers and the number of third line-out layers by 2 to obtain the number of circuit board layers required for the pin line-out of the chip.

In some embodiments, allocating respective line-out layer for the pins of the chip in the circuit board includes:
  allocating the first line-out layers corresponding to the power supply pins in an intermediate layer on the circuit board;
  taking all the first line-out layers as a whole first line-out layer, allocating the second line-out layers corresponding to the low-speed pins evenly in the upper and lower layers of the whole first line-out layer;
  taking all the first line-out layers and all the second line-out layers as a whole second line-out layer, allocating the third line-out layer corresponding to the RX pin in the upper layer of the whole second line-out layer, and allocating the third line-out layer corresponding to the TX pin to the lower layer of the whole second line-out layer; and
  allocating a ground layer for the upper and lower layers of each second line-out layer and each third line-out layer, respectively, wherein all ground layers are connected together through via holes and serve as line-out layers of the ground pins at a same time.

In some embodiments, the pin line-out design method for the chip further includes:

removing the ground layer between the first line-out layer and the second line-out layer.

In some embodiments, a via hole corresponding to the RX pin of the circuit board is a blind hole.

In some embodiments, the pin line-out design method for the chip further includes: performing an anti-pad design on each layer of the circuit board according to a via hole impedance requirement of the chip; wherein, except for wiring regions of the high-speed line and the low-speed line, the rest region of the circuit board is covered with copper.

In some embodiments, performing the anti-pad design on each layer of the circuit board according to the via hole impedance requirement of the chip includes:

disposing a first track-type anti-pad on the ground layer located on an upper layer of the third line-out layer corresponding to the RX pin;

disposing the first track-type anti-pad on the third line-out layer corresponding to the RX pin;

disposing a second track-type anti-pad on the ground layer located on a lower layer of the third line-out layer corresponding to the RX pin; wherein a diameter of the first track-type anti-pad is greater than a diameter of the second track-type anti-pad;

disposing a third track-type anti-pad on the first line-out layer corresponding to the power supply pins to prevent the power supply pin from being short-circuited; wherein a diameter of the third track-type anti-pad is equal to the diameter of the second track-type anti-pad; and disposing a circular anti-pad respectively on the ground layers located on the upper layer and the lower layer of the third line-out layer corresponding to the TX pin.

In some embodiments, the pin line-out design method for the chip further includes:

performing a simulation on a circuit board designed with anti-pads to obtain an actual via hole impedance of the circuit board;

determining whether the actual via hole impedance meets the via hole impedance requirement of the chip; and when the actual via hole impedance does not meet the via hole impedance requirement of the chip, adjusting a number of the anti-pads and/or sizes of the anti-pads on the circuit board, and returning to the step of performing the simulation on the circuit board designed with the anti-pads until the actual via hole impedance of the circuit board meets the via hole impedance requirement of the chip.

In order to solve the problems stated above, the present disclosure further provides a chip, wherein the chip is subjected to the pin line-out design by using the pin line-out design method for the chip according to the embodiments stated above.

The present disclosure provides a pin line-out design method for a chip. The method includes: according to the pin position information and the pin definition information of a chip, determining a number of circuit board layers required for pin line-out of the chip; allocating respective line-out layer for pins of the chip in a circuit board; and according to a pin density and transmission line width requirement of the chip, determining a specification of a via hole in the circuit board for leading the pin of the chip out to the corresponding line-out layer, to perform a corresponding line-out design on the basis of the via hole. It may be seen that the present disclosure provides a unified pin line-out design for the BGA packaged chip, which is more refined, thereby the quality of the line-out design of the pin of the chip is ensured.

The present disclosure further provides a chip with the same beneficial effect as the above pin line-out design method.

BRIEF DESCRIPTION OF THE DRAWINGS

To describe the technical solutions of the embodiments of the present disclosure more clearly, the following briefly introduces the accompanying drawings required for describing the prior art and the embodiments. Apparently, the accompanying drawings in the following description show only some embodiments of the present disclosure, and a person of ordinary skill in the art may still derive other drawings from these accompanying drawings without creative efforts.

DETAILED DESCRIPTION

The core of the present disclosure is to provide a chip and a pin line-out design method therefor, which provides a unified chip pin line-out design for a BGA packaged chip. In addition, the design is more refined, thereby the quality of the chip pin line-out design is ensured.

In order to make the objectives, technical solutions and advantages of the embodiments of the present disclosure more clearly, the technical solutions in the embodiments of the present disclosure may be described clearly and completely in conjunction with the accompanying drawings in the embodiments of the present disclosure. Apparently, the described embodiments are merely some embodiments, rather than all embodiments, of the present disclosure. Based on the embodiments of the present disclosure, all other embodiments derived by a person of ordinary skill in the art without creative efforts shall fall within the protection scope of the present disclosure.

Figure 1:
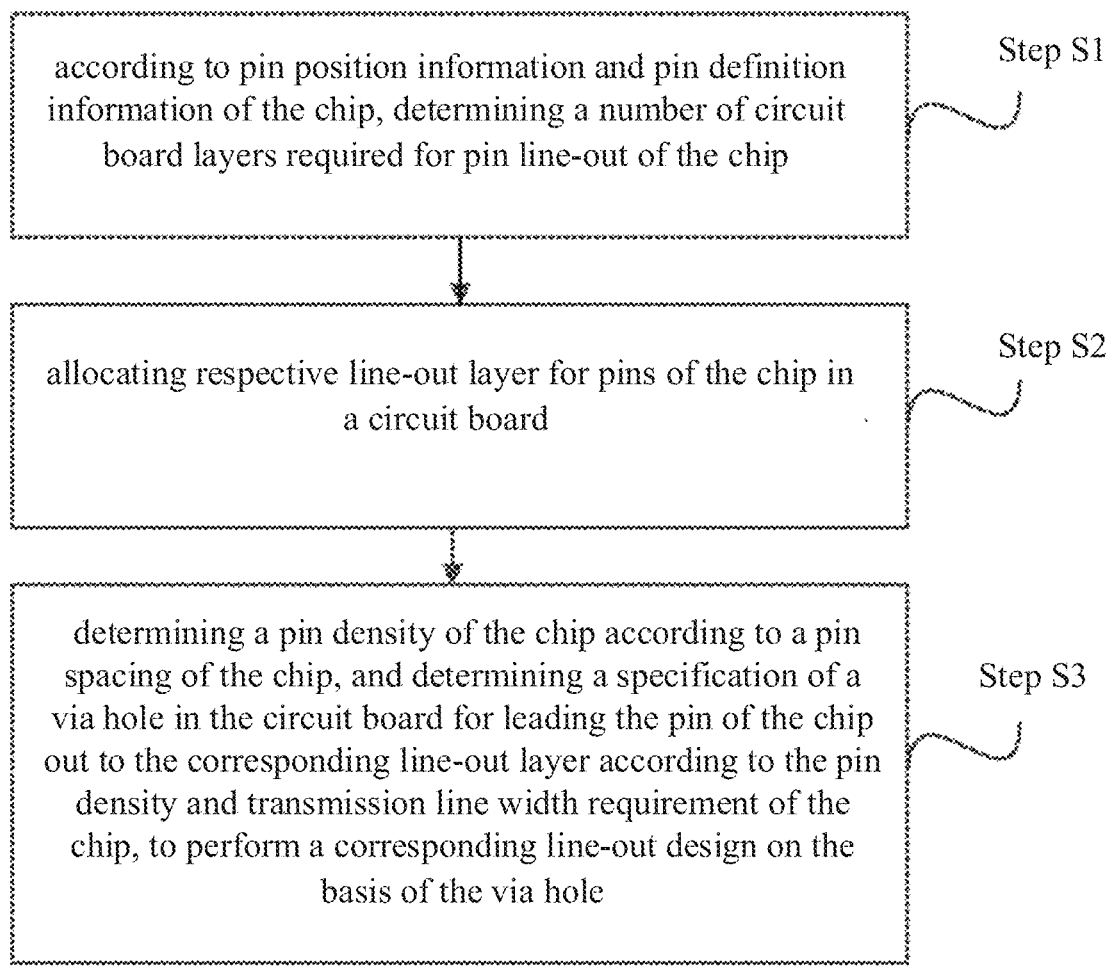
FIG. 1 is a flowchart of a pin line-out design method for a chip according to an embodiment of the present disclosure.

Referring to FIG. 1, FIG. 1 is a flowchart of a pin line-out design method for a chip according to an embodiment of the present disclosure.

This pin line-out design method for the chip is applied to a BGA packaged chip. The method includes the following steps.

Step S1: according to pin position information and pin definition information of the chip, determining a number of circuit board layers required for pin line-out of the chip.

According to the present disclosure, the definition information of pins in different positions on the chip may be obtained according to the pin position information and the pin definition information of the chip. For example, under a condition that the definition information of the pin in a certain position is a 5V power signal pin, the pin in this position may be obtained as a 5V power supply pin. Then, in the present disclosure, the number of circuit board layers required for the pin line-out of the chip may be determined according to the definition information of the pins in different positions on the chip.

S2: allocating respective line-out layer for pins of the chip in a circuit board.

In the present disclosure, in response to determining the number of circuit board layers required for the pin line-out of the chip, the line-out layers may be allocated to the pins of the chip in their respective circuit boards. That is, a certain layer of the circuit board is used for which pin line-out designs of the chip.

S3: determining a pin density of the chip according to a pin spacing of the chip, and determining a specification of a via hole in the circuit board for leading the pin of the chip out to the corresponding line-out layer according to the pin density and transmission line width requirement of the chip, to perform a corresponding line-out design on the basis of the via hole.

The chip is located on an upper layer of the circuit board, with a pin (a semicircular structure made of copper) of the chip facing down, and the pin of the chip is led out to the corresponding line-out layer by disposing the via hole in the circuit board. That is, in a case that the pin of the chip outputs a signal, the signal may be transmitted to the corresponding line-out layer through the via hole in contact with the pin of the chip. For example, the number of circuit board layers required for the pin line-out of the chip is 10, and a pin of the chip is led out from the fifth layer of the circuit board, this pin of the chip is connected to the fifth layer of the circuit board by punching a via hole in the circuit board.

In a case that there is a via hole in a certain layer of the circuit board, a transmission line on this layer needs to be disposed on a non-via-hole region. However, a hole spacing between adjacent via holes depends on the pin density of the chip (the pin density of the chip is determined by the pin spacing of the chip). It may be understood that there needs to be space for the layout of the transmission line between the adjacent via holes. Therefore, according to the present disclosure, the specification (a hole diameter and a pad diameter) of the via hole in the circuit board for leading the pin of the chip out to the corresponding line-out layer is determined according to the pin density and transmission line width requirement (a transmission line width may be calculated according to a transmission line impedance requirement) of the chip, to perform a corresponding line-out design on the basis of the via hole.

The present disclosure provides a pin line-out design method for a chip. The method includes: according to the pin position information and the pin definition information of the chip, determining the number of circuit board layers required for pin line-out of the chip; allocating respective line-out layer for pins of the chip in a circuit board; and according to a pin density and transmission line width requirement of the chip, determining a specification of a via hole in the circuit board for leading the pin of the chip out to the corresponding line-out layer, to perform a corresponding line-out design on the basis of the via hole. It may be seen that the present disclosure provides a unified pin line-out design for the BGA packaged chip, which is more refined, thereby the quality of the line-out design of the pin of the chip is ensured.

Based on the above embodiments:

as an embodiment, according to the pin position information and the pin definition information of the chip, determining the number of circuit board layers required for the pin line-out of the chip includes:

determining the pin position information and the pin definition information of the chip based on a pin map of the chip, wherein the pins of the chip include power supply pins, low-speed pins, high-speed pins and ground pins, with a signal transmission rate on a high-speed line connected to the high-speed pin>a preset rate threshold>a signal transmission rate on a low-speed line connected to the low-speed pin;

according to the pin position information and the pin definition information, determining power supply types corresponding to the power supply pins in different positions, position information of the low-speed pins, high-speed pin pairs composed of high-speed pins in different positions, and position information of a TX pin and an RX pin in each high-speed pin pair; and determining the number of circuit board layers required for the pin line-out of the chip according to the power supply types corresponding to the power pins in different positions, the position information of all low-speed pins, and the position information of the TX pin and the RX pin in each high-speed pin pair.

In the present disclosure, the pin position information and the pin definition information of the chip are determined based on the pin map of the chip. The pins of the chip include power supply pins, low-speed pins, high-speed pins and ground pins. The pin position information and the pin definition information of the chip include the position information of the power supply pins and their corresponding power supply types (for example, 5V and 3V), the position information of the low-speed pins, the position information of the high-speed pins and high-speed pin pairs (one high-speed pin pair includes a transmit (TX) pin and a receive (RX) pin) composed of the high-speed pins, and position information of the ground pins.

Based on this, in the present disclosure, according to the pin position information and the pin definition information of the chip, the power supply types corresponding to the power supply pins in different positions, the position information of the low-speed pins, the high-speed pin pairs composed of high-speed pins in different positions, and the position information of the TX pin and the RX pin in each high-speed pin pair may be determined. Then, in the present disclosure, the number of circuit board layers required for the pin line-out of the chip is determined according to the power supply types corresponding to the power pins in different positions, the position information of all low-speed pins, and the position information of the TX pin and the RX pin in each high-speed pin pair.

As an embodiment, determining the number of circuit board layers required for the pin line-out of the chip according to the power supply types corresponding to the power pins in different positions, the position information of all low-speed pins, and the position information of the TX pin and the RX pin in each high-speed pin pair includes:

determining a flow area required by the power supply pins of the same power supply type, and determining a number of first line-out layers required by all power supply pins according to the flow area and a single-layer area of the circuit board, wherein the power supply pins of the same power supply type share one line-out layer;

determining a total number of low-speed pins according to the position information of all low-speed pins, and determining a number of second line-out layers required by all low-speed pins according to the total number of low-speed pins;

according to the position information of the TX pin and the RX pin in each high-speed pin pair, determining a number of high-speed pin pairs in a same row on the pin map, and multiplying the determined number by 2 to obtain a number of third line-out layers required by all high-speed pins, wherein the TX pin and the RX pin in each high-speed pair correspond to different line-out layers; and adding the number of first line-out layers, the number of second line-out layers and the number of third line-out layers, and multiplying a sum of the number of first line-out layers, the number of second line-out layers and the number of third line-out layers by 2 to obtain the number of circuit board layers required for the pin line-out of the chip.

The process of the present disclosure to determine the number of circuit board layers required for the pin line-out of the chip is as follows: 1): determining the flow area required by the power supply pins of the same power supply type on the chip, and determining the number of line-out layers (referred to as the number of first line-out layers) required by all power supply pins on the chip according to the flow area required by the power supply pins of the same power supply type and the single-layer area of the circuit board. It should be noted that the power supply pins of the same power supply type share one line-out layer. In a case that the single-layer area of the circuit board is sufficient for flow use of the power supply pins of a plurality of power supply types, the power supply pins of the plurality of power supply types may also share one line-out layer, but outgoing lines of the power supply pins of different power supply types that share one line-out layer should be separated in design, without affecting each other. In a case that the single-layer area of the circuit board is not sufficient for flow use of the power supply pins of a certain power supply type, a plurality of line-out layers may be allocated for the power supply pins of this power supply type until it is sufficient for flow use of the power supply pins. For example, there are two power supply types corresponding to the power supply pins on the chip: 3V and 5V. In a case that the single-layer area of the circuit board is sufficient for flow use of the 3V power supply pins and also for flow use of the 5V power supply pins, the number of first line-out layers required by all power supply pins on the chip is set to 2. 2): determining the total number of low-speed pins on the chip according to the position information of all low-speed pins on the chip, and determining the number of line-out layers (referred to as the number of second line-out layers) required by all low-speed pins on the chip according to the total number of low-speed pins on the chip. It may be understood that the number of second line-out layers is sufficient for the wiring design of all low-speed pins on the chip. It should also be noted that two line-out layers are generally allocated for the low-speed pins on the chip. In a case that the two line-out layers are not sufficient for the wiring design of all the low-speed pins on the chip, the remaining low-speed pins not suffered by the wiring design may also be connected to an idle position of the remaining line-out layers through via holes to carry out a line-out design in this idle position. 3): according to the position information of the TX pin and the RX pin in each high-speed pin pair on the chip, determining the number of high-speed pin pairs in the same row on the pin map of the chip. It should be noted that outgoing lines of the high-speed pin pairs in the same row on the pin map of the chip need to be designed in different line-out layers, otherwise the outgoing lines may affect each other. In addition, outgoing lines of the TX pin and the RX pin need to be designed in different line-out layers, so the number of high-speed pin pairs in the same row on the pin map of the chip is multiplied by 2. The product result is the number of line-out layers (referred to as the number of third line-out layers) required by all high-speed pins on the chip. 4): allocating a ground layer respectively to each second line-out layer corresponding to the low-speed pins and upper and lower layers of each third line-out layer corresponding to the high-speed pins. Therefore, the number of the first line-out layers required by all power supply pins on the chip, the number of the second line-out layers required by all low-speed pins and the number of the third line-out layers required by all high-speed pins are added, and the sum of the number of the second line-out layers required by all low-speed pins and the number of the third line-out layers required by all high-speed pins is multiplied by 2. The product result is the number of the circuit board layers required for line-out of all pins of the chip.

As an embodiment, allocating respective line-out layer for the pins of the chip in the circuit board includes:

allocating the first line-out layers corresponding to the power supply pins to an intermediate layer on the circuit board;

taking all the first line-out layers as a whole first line-out layer, allocating the second line-out layers corresponding to the low-speed pins evenly in the upper and lower layers of the whole first line-out layer;

taking all the first line-out layers and all the second line-out layers as a whole second line-out layer, allocating the third line-out layer corresponding to the RX pin in the upper layer of the whole second line-out layer, and the third line-out layer corresponding to the TX pin to the lower layer of the whole second line-out layer; and allocating a ground layer for the upper and lower layers of each second line-out layer and each third line-out layer, respectively, wherein all ground layers are connected together through via holes and serve as line-out layers of the ground pins at a same time.

In the present disclosure, the process of allocating respective line-out layer for the pins of the chip in the circuit board is as follows. 1): allocating the first line-out layers corresponding to the power supply pins on the chip in the intermediate layer of the circuit board. The thickness of copper laid on the first line-out layer may be selected according to a flow demand. 2): taking all the first line-out layers as the whole first line-out layer, allocating the second line-out layers corresponding to the low-speed pins on the chip in the upper and lower layers of the whole first line-out layer. For example, there are totally two second line-out layers corresponding to the low-speed pins on the chip, wherein one second line-out layer is allocated in the upper layer of the whole first line-out layer, and the other second line-out layer is allocated in the lower layer of the whole first line-out layer to achieve uniform allocation 3): taking all the first line-out layers and all the second line-out layers as the whole second line-out layer, allocating the third line-out layer corresponding to the RX pin on the chip in the upper layer of the whole second line-out layer, and the third line-out layer corresponding to the TX pin on the chip in the lower layer of the whole second line-out layer, this is because the high-speed transmission line requirements are higher, and the line-out layers near the top and bottom layers are better. In a case that the high-speed pins require more line-out layers, internal electrical layers of a rest double ground plane reference may also be used. 4): allocating a ground layer respectively to each second line-out layer and the upper and lower layers of each third line-out layer. It should be noted that all ground layers are connected together through via holes and serve as the line-out layers of the ground pins on the chip at a same time.

It should be noted that in addition to the stacked layers number determination method and stacked layers allocation method for the circuit boards provided by the above embodiment of the present disclosure, other stacked layers number determination methods and stacked layers allocation methods may also be used, as long as the pin line-out design of the chip may be realized, which may not be particularly limited in the present disclosure.

As an embodiment, the pin line-out design method for the chip further includes:
 removing the ground layer between the first line-out layer and the second line-out layer.

Further, in order to save the cost, the ground layer between the first line-out layer corresponding to the power supply pins and the second line-out layer corresponding to the low-speed pins may be removed in the present disclosure, so that the second line-out layer corresponding to the low-speed pins only refers to the ground layer at one side. In addition, a dielectric thickness from an outgoing line of the low-speed pin to a power supply layer is at least 3 times a dielectric thickness of the outgoing line of the low-speed pin to the ground layer to reduce the interference of a power supply to a signal.

As an embodiment, a via hole corresponding to the RX pin of the circuit board is a blind hole.

A via hole corresponding to the RX pin of the circuit board of the present disclosure is a blind hole (the blind hole is generally a laser hole or a mechanical hole). The blind hole may achieve a smaller hole length in order to reduce the via hole loss.

As an embodiment, the pin line-out design method for the chip further includes:
 performing an anti-pad design on each layer of the circuit board according to a via hole impedance requirement of the chip; wherein, except for wiring regions of the high-speed line and the low-speed line, the rest region in the circuit board is covered with copper.

Further, according to the present disclosure, the anti-pad design may also be performed for each layer of the circuit board according to the via hole impedance requirement of the chip. It should be noted that except for the wiring regions of the high-speed line and the low-speed line, a certain thickness of copper may also be laid on the rest region of the circuit board.

As an embodiment, performing the anti-pad design for each layer of the circuit board according to the via hole impedance requirement of the chip includes:
 disposing a first track-type anti-pad on the ground layer located on an upper layer of the third line-out layer corresponding to the RX pin;
 disposing the first track-type anti-pad on the third line-out layer corresponding to the RX pin;
 disposing a second track-type anti-pad on the ground layer located on a lower layer of the third line-out layer corresponding to the RX pin; wherein a diameter of the first track-type anti-pad is greater than a diameter of the second track-type anti-pad;
 disposing a third track-type anti-pad on the first line-out layer corresponding to the power supply pin; wherein a diameter of the third track-type anti-pad is equal to the diameter of the second track-type anti-pad; and
 disposing a circular anti-pad respectively on the ground layers located on the upper layer and the lower layer of the third line-out layer corresponding to the TX pin.

Figure 2:
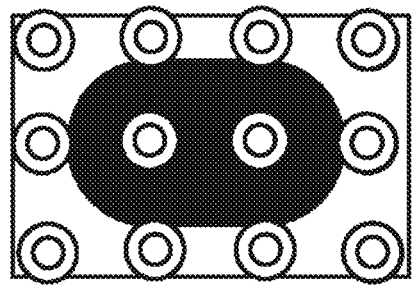
FIG. 2 is a schematic structural diagram of a first track-type anti-pad according to an embodiment of the present disclosure.
Figure 3:
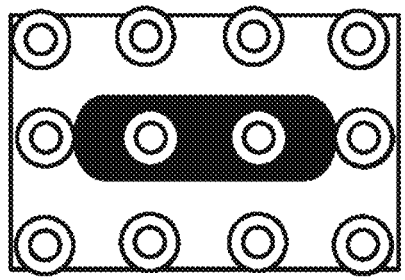
FIG. 3 is a schematic structural diagram of a second track-type anti-pad according to an embodiment of the present disclosure.
Figure 4:
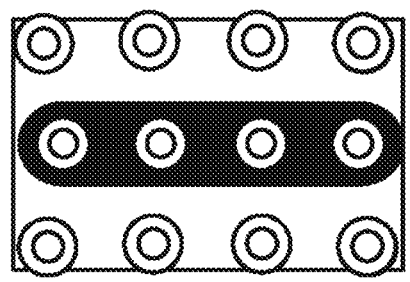
FIG. 4 is a schematic structural diagram of a third track-type anti-pad according to an embodiment of the present disclosure.
Figure 5:
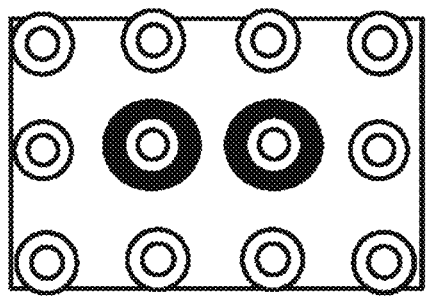
FIG. 5 is a schematic structural diagram of a circular anti-pad according to an embodiment of the present disclosure.

According to the present disclosure, the anti-pad design (copper hollow-out design) is performed for each layer of the circuit board: 1) disposing the first track-type anti-pad on the ground layer located on the upper layer of the third line-out layer corresponding to the RX pin, wherein the structure of the first track-type anti-pad is shown in FIG. 2 (the black part in FIG. 2 represents the anti-pad); 2) disposing the first track-type anti-pad on the third line-out layer corresponding to the RX pin; 3) disposing the second track-type anti-pad on the ground layer located on the lower layer of the third line-out layer corresponding to the RX pin, wherein the structure of the second track-type anti-pad is shown in FIG. 3, and a diameter of the first track-type anti-pad is greater than a diameter of the second track-type anti-pad; 4) disposing the third track-type anti-pad on the first line-out layer corresponding to the power supply pin in order to prevent the power supply pin and the ground pin from being short-circuited together, wherein the structure of the third track-type anti-pad is shown in FIG. 4, and a diameter of the third track-type anti-pad is equal to the diameter of the second track-type anti-pad; and 5) disposing a circular anti-pad respectively on the ground layers located on the upper layer and the lower layer of the third line-out layer corresponding to the TX pin, wherein the structure of the circular anti-pad is shown in FIG. 5.

As an embodiment, the pin line-out design method for the chip further includes:
 performing a simulation on a circuit board designed with anti-pads to obtain an actual via hole impedance of the circuit board;
 determining whether the actual via hole impedance meets the via hole impedance requirement of the chip; and
 when the actual via hole impedance does not meet the via hole impedance requirement of the chip, adjusting a number of the anti-pads and/or sizes of the anti-pads on the circuit board, and returning to the step of performing the simulation on the circuit board designed with the anti-pads until the actual via hole impedance of the circuit board meets the via hole impedance requirement of the chip.

Further, in a case that the anti-pads and the via hole impedance are both too small, the via hole impedance requirement may not be met. In a case that the anti-pads are too large, signal line reference reduction, or cross-segmentation and power supply flow area reduction and other negative effects may be brought, so the simulation may be performed on the circuit board designed with the anti-pads after designing the anti-pad for each layer of the circuit board, to obtain the actual via hole impedance of the circuit board. Then, whether the actual via hole impedance of the circuit board meets the chip via hole impedance requirement is determined. In a case that the chip via hole impedance requirement is met, there is no need to adjust the anti-pads on the circuit board; and in a case that the chip via hole impedance requirement is not met, the number of the anti-pads and/or sizes of the anti-pads on the circuit board may be adjusted, and the step of performing the simulation on the circuit board designed with the anti-pads is returned until the actual via hole impedance of the circuit board meets the chip via hole impedance requirement.

Figure 6:
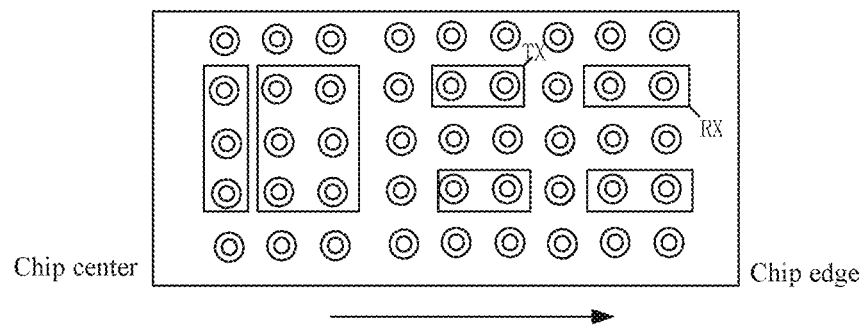
FIG. 6 is a partial schematic diagram of a pin map of a chip according to an embodiment of the present disclosure.

In summary, the pin line-out design for the chip is described in conjunction with a embodiment (taking the pin map shown in FIG. 6 as an example):

as shown in FIG. 6, from a chip center to a chip edge, a power supply network (corresponding to the power supply pins), a low-speed network (corresponding to the low-speed pins), a high-speed network (corresponding to the high-speed pin pairs) are framed in turn, and the rest unframed region is a ground network (corresponding to the ground pins). All networks need to complete fan-out from the chip center towards the chip edge, and the paracentral networks certainly cross the edge networks.

Figure 7:
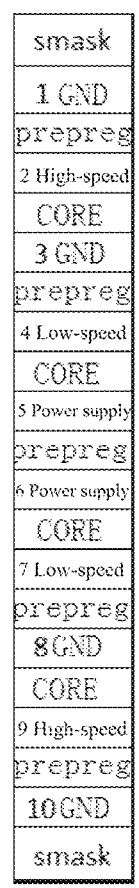
FIG. 7 is a schematic diagram of the allocation of line-out layers in a circuit board according to an embodiment of the present disclosure.

The following design is directed to outgoing lines of this local chip. It is assumed that two power supply layers (for a power supply pin line-out design), two low-speed layers (for a low-speed pin line-out design), two high-speed layers (for a high-speed pin line-out design) are needed, in a total of six internal electrical layers, the remaining layer is a reflux ground layer (for a ground pin line-out design), and a typical stacked layers of the circuit boards is 12 layers. To save the cost, a reference ground layer is removed from the low-speed lines, and the circuit board may be reduced to 10 layers. As shown in FIG. 7, the power supply layers are the fifth layer L5 and the sixth layer L6, the low-speed layers are the fourth layer L4 and the seventh layer L7, the high-speed layers are the second layer L2 and the ninth layer L9 as optimal line-out layers of the double ground plane reference, and the remaining layer is the ground layer for signal reflux. In addition, in the actual production process of the circuit board, it is necessary to add a smask layer, a preperg and CORE, which is a necessary step for the circuit board production.

Since a chip pin spacing is 0.8 mm (equal to 32 mils, which belongs to a high-density chip), in order to ensure a line-out space on the circuit board, small via holes (for example, 8 mils (hole diameter) to 16 mils (pad diameter)) are required. In the line-out process of the circuit board, it is necessary to control a via hole impedance (while considering the control over a transmission line impedance as well as crosstalk and power supply interference between various network signals, guaranteed flow area, and others). Therefore, four types of anti-pads are designed: a first track-type anti-pad (having an anti-pad diameter of 40 to 48 mils, which may be adjusted according to the impedance), a second track-type anti-pad (having an anti-pad diameter of 24 mils), a third track-type anti-pad (having an anti-pad diameter of 24 mils, a circumference of the third track-type anti-pad being greater than a circumference of the second track-type anti-pad), and a circular anti-pad (having an anti-pad diameter of 24 to 28 mils, which may be adjusted according to impedance needs).

Figure 8:
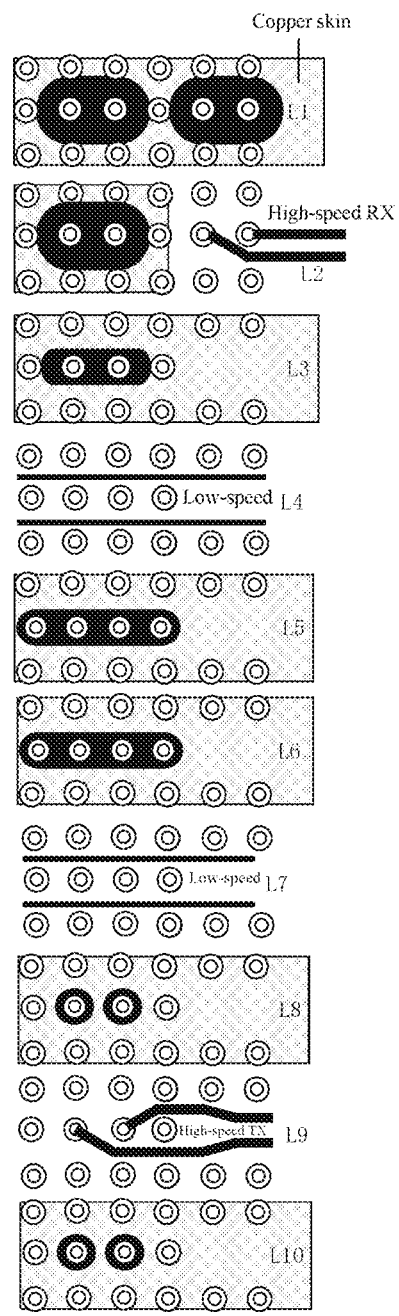
FIG. 8 is a schematic diagram of an anti-pad design of a circuit board according to an embodiment of the present disclosure.

The uses and purposes of the four anti-pad types are as follows (referring to FIG. 8, taking a local region of a high-speed line as an example).

The first track-type anti-pad is used in the L1 and L2 layers: the large anti-pad optimizes a via hole impedance of a high-speed RX network.

Figure 9:
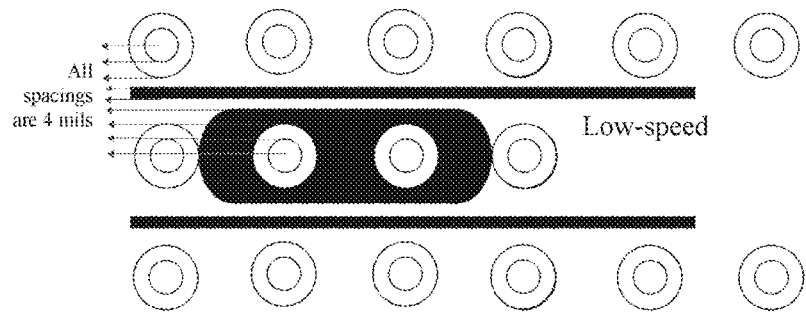
FIG. 9 is a schematic diagram of a structure of a second track-type anti-pad on a line-out layer corresponding to a first low-speed pin according to an embodiment of the present disclosure.
Figure 10:
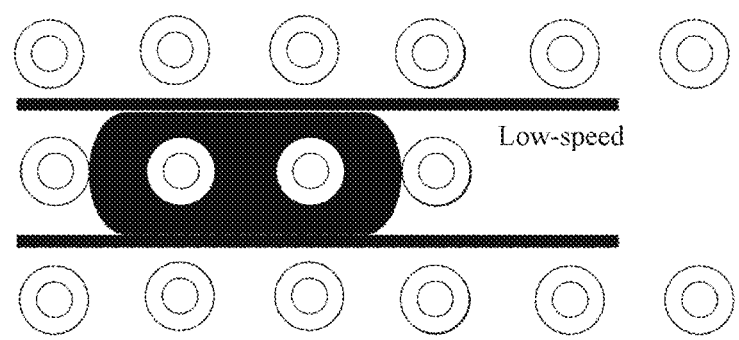
FIG. 10 is a schematic diagram of a structure of a second track-type anti-pad on a line-out layer corresponding to a second low-speed pin according to an embodiment of the present disclosure.
Figure 11:
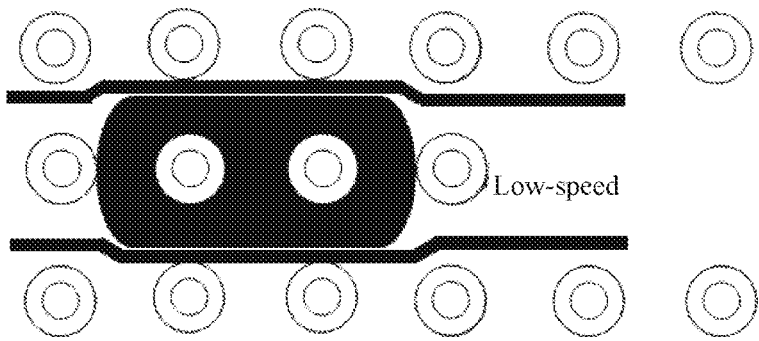
FIG. 11 is a schematic diagram of a structure of a second track-type anti-pad on a line-out layer corresponding to a third low-speed pin according to an embodiment of the present disclosure.

The second track-type anti-pad is used in the L3 layer: a low-speed line reference layer of the L4 layer is guaranteed. As shown in FIG. 9, assuming the low-speed line has a width of 4 mils, 4 mils at each of two sides is referenced. In a case that the low-speed line rate is low or the high-speed line impedance requirement is more stringent, the diameter of the second track-type anti-pad may be increased to 32 mils to 40 mils. As shown in FIG. 10, the anti-pad is increased to 32 mils: the position of the low-speed line remains unchanged, sacrificing a 4 mil reference layer at one side. As shown in FIG. 11, the anti-pad is increased to 40 mils: the low-speed line is pushed up and down respectively by 4 mills at both sides, sacrificing 4 mils reference layers at both sides at a same time.

The third track-type anti-pad is used in the L5 and L6 layers to prevent the power supply from being short-circuited, thereby the normal reference of the low-speed line on the L4 layer is ensured, and also that the power supply layer has a large flow width is ensured.

The circuit anti-pad is used in the L8 and L10 layers: due to short residual stumps on the L8 and L10 layers and low residual stump capacitance, the general circular anti-pad may be used. At the same time, a more complete reference to a high-speed line on the L9 layer may be met, and a cross-segmentation width is reduced. Oversized anti-pads may sacrifice a high-speed line reference layer, so the anti-pad is recommended not to exceed 28 mils.

Except for the wiring regions of the high-speed line and the low-speed line, the rest regions on the circuit board are covered with copper. A via hole corresponding to a high-speed RX pin in the L2 layer are a blind hole; and the L9 layer is an internal electrical layer having smallest residual stumps and is used for line-out of the high-speed TX pin.

It may be seen that the present disclosure details the line-out planning, stacked layers design and via hole anti-pad design of the high-density chip. Through this design method, the signal quality of the high-speed line may be effectively guaranteed, while taking into account the signal quality of the low-speed line and the flow area of the power supply, thereby achieving a fine design of the pin line-out of the high-speed high-density chip, and further the design quality of the circuit board is improved.

The present disclosure further provides a chip. The chip is subjected to the pin line-out design by using the pin line-out design method for the chip according to any one of the embodiments as described above.

The introduction of the chip provided by the present disclosure refers to the above embodiments of the pin line-out design, which may not be repeated here.

It should be noted that, as used in the present description, relation terms such as "first" and "second" are used merely to distinguish a subject or an operation from another subject or another operation, and not to require or imply any substantial relation or sequence between these subjects or operations. Moreover, terms "include", "contain" or any variation thereof are intended to cover a nonexclusive containing, such that a process, a method, an item or a device containing a series of elements not only includes these elements, but also includes other elements that are not set forth, or also includes an inherent element of such a process, method, item or device. Without further limitation, an element defined by a phrase "include a . . . " does not mean that other elements are excluded from the process, method, item or device including the same element.

The foregoing description of the disclosed embodiments enables those skilled in the art to realize or use the present disclosure. A variety of modifications of these embodiments may be obvious to those skilled in the art, and the general principles defined herein may be implemented in other embodiments without departing from the spirit or scope of the present disclosure. Accordingly, the present disclosure may not be limited to these embodiments shown herein, but may conform to the widest range consistent with the principles and novel features disclosed herein.

The invention claimed is:

1. A pin line-out design method for a chip, applied to a ball grid array (BGA) packaged chip, the method comprising:
   according to pin position information and pin definition information of the chip, determining a number of circuit board layers required for pin line-out of the chip;
   allocating respective line-out layer for pins of the chip in a circuit board;
   determining a pin density of the chip according to a pin spacing of the chip, and determining a specification of a via hole in the circuit board for leading the pins of the chip out to the corresponding line-out layer according to the pin density and transmission line width requirement of the chip, to perform a corresponding line-out design on the basis of the via hole;
   wherein according to the pin position information and the pin definition information of the chip, determining the number of circuit board layers required for the pin line-out of the chip comprises:
   determining the pin position information and the pin definition information of the chip based on a pin map of the chip, wherein the pins of the chip comprise power supply pins, low-speed pins, high-speed pins and ground pins, with a signal transmission rate on a high-speed line connected to the high-speed pins >a preset rate threshold >a signal transmission rate on a low-speed line connected to the low-speed pins;
   according to the pin position information and the pin definition information, determining power supply types corresponding to the power supply pins in different positions, position information of the low-speed pins, high-speed pin pairs composed of high-speed pins in different positions, and position information of a TX pin and a RX pin in each high-speed pin pair;
   determining the number of circuit board layers required for the pin line-out of the chip according to the power supply types corresponding to the power pins in different positions, the position information of all low-speed pins, and the position information of the TX pin and the RX pin in each high-speed pin pair, wherein the TX pin is a transmit pin and the RX pin is a receive pin;
   wherein determining the number of circuit board layers required for the pin line-out of the chip according to the power supply types corresponding to the power pins in different positions, the position information of all low-speed pins, and the position information of the TX pin and the RX pin in each high-speed pin pair comprises:
   determining a flow area required by the power supply pins of a same power supply type, and determining a number of first line-out layers required by all power supply pins according to the flow area and a single-layer area of the circuit board, wherein the power supply pins of the same power supply type share one line-out layer;
   determining a total number of low-speed pins according to the position information of all low-speed pins, and determining a number of second line-out layers required by all low-speed pins according to the total number of low-speed pins;
   according to the position information of the TX pin and the RX pin in each high-speed pin pair, determining a number of high-speed pin pairs in a same row on the pin map, and multiplying the determined number by 2 to obtain a number of third line-out layers required by all high-speed pins, wherein the TX pin and the RX pin in each high-speed pair correspond to different line-out layers; and
   adding the number of first line-out layers, the number of second line-out layers and the number of third line-out layers, and multiplying a sum of the number of first line-out layers, the number of second line-out layers and the number of third line-out layers by 2 to obtain the number of circuit board layers required for the pin line-out of the chip.

2. The pin line-out design method for the chip according to claim 1, wherein allocating respective line-out layer for the pins of the chip in the circuit board comprises:
   allocating first line-out layers corresponding to the power supply pins in an intermediate layer on the circuit board;
   taking all the first line-out layers as a whole first line-out layer, allocating second line-out layers corresponding to the low-speed pins evenly in upper and lower layers of the whole first line-out layer;
   taking all the first line-out layers and all the second line-out layers as a whole second line-out layer, allocating third line-out layer corresponding to the RX pin in the upper layer of the whole second line-out layer, and allocating the third line-out layer corresponding to the TX pin to the lower layer of the whole second line-out layer; and
   allocating a ground layer for the upper and lower layers of each second line-out layer and each third line-out layer, respectively, wherein all ground layers are connected together through via holes and serve as line-out layers of the ground pins at a same time.

3. The pin line-out design method for the chip according to claim 2, wherein the pin line-out design method for the chip further comprises:
   removing the ground layer between the first line-out layer and the second line-out layer.

4. The pin line-out design method for the chip according to claim 2, wherein a via hole corresponding to the RX pin of the circuit board is a blind hole.

5. The pin line-out design method for the chip according to claim 2, wherein the pin line-out design method for the chip further comprises:
   performing an anti-pad design on each layer of the circuit board according to a via hole impedance requirement of the chip; wherein, except for wiring regions of the high-speed line and the low-speed line, a rest region of the circuit board is covered with copper.

6. The pin line-out design method for the chip according to claim 5, wherein performing the anti-pad design on each layer of the circuit board according to the via hole impedance requirement of the chip comprises:
   disposing a first track-type anti-pad on the ground layer located on an upper layer of the third line-out layer corresponding to the RX pin;

disposing the first track-type anti-pad on the third line-out layer corresponding to the RX pin;
disposing a second track-type anti-pad on the ground layer located on a lower layer of the third line-out layer corresponding to the RX pin; wherein a diameter of the first track-type anti-pad is greater than a diameter of the second track-type anti-pad;
disposing a third track-type anti-pad on the first line-out layer corresponding to the power supply pins to prevent the power supply pin from being short-circuited; wherein a diameter of the third track-type anti-pad is equal to the diameter of the second track-type anti-pad; and
disposing a circular anti-pad respectively on the ground layers located on the upper layer and the lower layer of the third line-out layer corresponding to the TX pin.

7. The pin line-out design method for the chip according to claim 6, wherein the pin line-out design method for the chip further comprises:
performing a simulation on a circuit board designed with anti-pads to obtain an actual via hole impedance of the circuit board;
determining whether the actual via hole impedance meets the via hole impedance requirement of the chip; and
when the actual via hole impedance does not meet the via hole impedance requirement of the chip, adjusting a number of the anti-pads and/or sizes of the anti-pads on the circuit board, and returning to the step of performing the simulation on the circuit board designed with the anti-pads until the actual via hole impedance of the circuit board meets the via hole impedance requirement of the chip.

8. A chip, wherein the chip is subjected to the pin line-out design by using the pin line-out design method for the chip according to claim 1.

9. The chip according to claim 8, wherein allocating respective line-out layer for the pins of the chip in the circuit board comprises:
allocating first line-out layers corresponding to the power supply pins in an intermediate layer on the circuit board;
taking all the first line-out layers as a whole first line-out layer, allocating second line-out layers corresponding to the low-speed pins evenly in upper and lower layers of the whole first line-out layer;
taking all the first line-out layers and all the second line-out layers as a whole second line-out layer, allocating third line-out layer corresponding to the RX pin in the upper layer of the whole second line-out layer, and allocating the third line-out layer corresponding to the TX pin to the lower layer of the whole second line-out layer; and
allocating a ground layer for the upper and lower layers of each second line-out layer and each third line-out layer, respectively, wherein all ground layers are connected together through via holes and serve as line-out layers of the ground pins at a same time.

10. The chip according to claim 9, wherein the pin line-out design method for the chip further comprises:
removing the ground layer between the first line-out layer and the second line-out layer.

11. The chip according to claim 9, wherein a via hole corresponding to the RX pin of the circuit board is a blind hole.

12. The chip according to claim 9, wherein the pin line-out design method for the chip further comprises:
performing an anti-pad design on each layer of the circuit board according to a via hole impedance requirement of the chip; wherein, except for wiring regions of the high-speed line and the low-speed line, a rest region of the circuit board is covered with copper.

13. The chip according to claim 12, wherein performing the anti-pad design on each layer of the circuit board according to the via hole impedance requirement of the chip comprises:
disposing a first track-type anti-pad on the ground layer located on an upper layer of the third line-out layer corresponding to the RX pin;
disposing the first track-type anti-pad on the third line-out layer corresponding to the RX pin;
disposing a second track-type anti-pad on the ground layer located on a lower layer of the third line-out layer corresponding to the RX pin; wherein a diameter of the first track-type anti-pad is greater than a diameter of the second track-type anti-pad;
disposing a third track-type anti-pad on the first line-out layer corresponding to the power supply pins to prevent the power supply pin from being short-circuited; wherein a diameter of the third track-type anti-pad is equal to the diameter of the second track-type anti-pad; and
disposing a circular anti-pad respectively on the ground layers located on the upper layer and the lower layer of the third line-out layer corresponding to the TX pin.

14. The chip according to claim 13, wherein the pin line-out design method for the chip further comprises:
performing a simulation on a circuit board designed with anti-pads to obtain an actual via hole impedance of the circuit board;
determining whether the actual via hole impedance meets the via hole impedance requirement of the chip; and
when the actual via hole impedance does not meet the via hole impedance requirement of the chip, adjusting a number of the anti-pads and/or sizes of the anti-pads on the circuit board, and returning to the step of performing the simulation on the circuit board designed with the anti-pads until the actual via hole impedance of the circuit board meets the via hole impedance requirement of the chip.

15. The chip according to claim 8, wherein determining the flow area required by the power supply pins of the same power supply type, and determining the number of first line-out layers required by all power supply pins according to the flow area and the single-layer area of the circuit board comprises:
when the single-layer area of the circuit board is sufficient for flow use of the power supply pins of a plurality of power supply types, the power supply pins of the plurality of power supply types sharing one line-out layer, but separating outgoing lines of the power supply pins of different power supply types that share one line-out layer; and
when the single-layer area of the circuit board is not sufficient for flow use of the power supply pins of a certain power supply type, allocating a plurality of line-out layers for the power supply pins of the power supply type until it is sufficient for flow use of the power supply pins.

16. The chip according to claim 8, wherein determining the total number of the low-speed pins according to the position information of all low-speed pins, and determining the number of the second line-out layers required by all low-speed pins according to the total number of the low-speed pins comprises:

allocating two line-out layers for the low-speed pins on the chip when the two line-out layers are not sufficient for the wiring design of all the low-speed pins on the chip, connecting the remaining low-speed pins not suffered by the wiring design to an idle position of the remaining line-out layers through via holes to carry out a line-out design in the idle position.

17. The chip according to claim 8, wherein outgoing lines of the high-speed pin pairs in a same row on the pin map of the chip are designed in different line-out layers.

18. The pin line-out design method for the chip according to claim 1, wherein determining the flow area required by the power supply pins of the same power supply type, and determining the number of first line-out layers required by all power supply pins according to the flow area and the single-layer area of the circuit board comprises:

when the single-layer area of the circuit board is sufficient for flow use of the power supply pins of a plurality of power supply types, the power supply pins of the plurality of power supply types sharing one line-out layer, but separating outgoing lines of the power supply pins of different power supply types that share one line-out layer; and when the single-layer area of the circuit board is not sufficient for flow use of the power supply pins of a certain power supply type, allocating a plurality of line-out layers for the power supply pins of the power supply type until it is sufficient for flow use of the power supply pins.

19. The pin line-out design method for the chip according to claim 1, wherein determining the total number of the low-speed pins according to the position information of all low-speed pins, and determining the number of the second line-out layers required by all low-speed pins according to the total number of the low-speed pins comprises:

allocating two line-out layers for the low-speed pins on the chip;

when the two line-out layers are not sufficient for the wiring design of all the low-speed pins on the chip, connecting the remaining low-speed pins not suffered by the wiring design to an idle position of the remaining line-out layers through via holes to carry out a line-out design in the idle position.

20. The pin line-out design method for the chip according to claim 1, wherein outgoing lines of the high-speed pin pairs in a same row on the pin map of the chip are designed in different line-out layers.

\* \* \* \* \*